United States Patent [19]
Aoki et al.
[11] Patent Number: 5,061,565
[45] Date of Patent: Oct. 29, 1991

[54] FILM FOR HEAT-SENSITIVE MIMEOGRAPH STENCIL

[75] Inventors: Seizo Aoki, Shiga; Kenji Tsunashima, Kyoto; Toshiya Yoshii, Ootsu; Yasuji Nakahara, Ootsu; Takashi Sumiya, Ootsu; Takashi Mimura, Ootsu, all of Japan

[73] Assignee: Toray Industries, Inc., Japan

[21] Appl. No.: 329,895

[22] PCT Filed: Sep. 2, 1987

[86] PCT No.: PCT/JP87/00653

§ 371 Date: Jan. 11, 1990

§ 102(e) Date: Jan. 11, 1990

[87] PCT Pub. No.: WO88/06975

PCT Pub. Date: Sep. 22, 1988

[30] Foreign Application Priority Data

Mar. 18, 1987 [JP] Japan .............................. 62-61336

[51] Int. Cl.$^5$ .............................................. B32B 9/00

[52] U.S. Cl. .................................... 428/409; 428/195; 428/480; 428/423.1; 101/127; 101/128.21; 101/128.4

[58] Field of Search ............ 101/114, 125, 127, 128.2, 101/128.3, 128.4; 428/195, 409, 480, 423.1; 427/143; 156/322, 332

[56] References Cited

U.S. PATENT DOCUMENTS

| | | | |
|---|---|---|---|
| 4,766,033 | 8/1988 | Yoshimura et al. | 428/910 |
| 4,961,377 | 10/1990 | Bando et al. | 428/423.1 |

*Primary Examiner*—Patrick J. Ryan
*Attorney, Agent, or Firm*—Austin R. Miller

[57] ABSTRACT

A film for heat-sensitive mimeograph stencil and a heat-sensitive mimeograph stencil comprising a porous support and the film laminated thereon are disclosed. Since the film of the present invention has an energy of crystal fusion ΔHu of 3-11 cal/g and has a difference Tm in temperature of the crystal fusion-starting point and the crystal fusion-terminating point of 50° C. to 100° C., the heat sensitivity is high, so that the characters and symbols or figures can be printed clearly, and the unevenness in the thickness and the light and shade of the printed characters may substantially be eliminated. Further, since it is not necessary to make the film thin, productivity and ease of handling may be promoted.

13 Claims, No Drawings

FILM FOR HEAT-SENSITIVE MIMEOGRAPH STENCIL

TECHNICAL FIELD

This invention relates to a film for heat-sensitive mimeograph stencil which may be processed by flash irradiation with a xenon flash lamp and the like, or by a thermal head. This invention also relates to a heat-sensitive mimeograph stencil employing the film.

BACKGROUND ART

Conventional heat-sensitive mimeograph stencils typically comprise a film for heat-sensitive mimeograph stencil and a porous support adhered to the film with an adhesive. Conventional films for heat-sensitive mimeograph stencils include vinyl chloride-vinylidene chloride copolymer film, polypropylene film and polyethyleneterephthalate film, and conventional porous supports include tissue paper and polyester gauze.

However, if the film for heat-sensitive mimeograph stencil is made of a vinyl chloride film, vinylidene chloride copolymer film or a polypropylene film as disclosed in, for example, Japanese Patent Disclosure (Kokai) No. 48395/85, the film does not have sufficient stiffness and its slipperiness is bad, so that a thick film has to be used. Further, since the energy of crystal fusion ΔHu of the resin is great, the heat-sensitivity is low. As a result, characters and paint-printed symbols or figures (symbols or figures such as ● and ■ in which ink is applied in a large area) cannot be printed clearly. On the other hand, if the film for heat-sensitive mimeograph stencil is made of a polyethyleneterephthalate film as disclosed in, for example, Japanese Patent Disclosure (Kokai) Nos. 85996/85 and 16786/84, the film has sufficient stiffness and the slipperiness is relatively good. However, since its ΔHu is great, to promote heat-sensitivity the thickness of the film must be made considerably small. As a result, the film tends to be broken easily and to be wrinkled during the film forming process, so that the production yield may be largely reduced. In either case, the shades of the printed characters, and the thicknesses of the printed characters are uneven, and the thin black characters cannot be printed due to the low sensitivity.

DISCLOSURE OF THE INVENTION

Accordingly, the object of the present invention is to provide a film for a heat-sensitive mimeograph stencil with a high heat-sensitivity by which characters and paint-printed symbols and figures may be clearly printed, the characters being free from unevenness of thickness and from light and shade, which film excels in durability and ease of handling, and which film offers high production yield.

Another object of the present invention is to provide a heat-sensitive mimeograph stencil employing the above-described film for heat-sensitive mimeograph stencils of the present invention.

The film for heat-sensitive mimeograph stencils of the present invention is made of a biaxially stretched polyester-based film having an energy of crystal fusion ΔHu of 3–11 cal/g and a difference ΔTm between the crystal fusion-terminating temperature and the crystal fusion-starting temperature of 50° C. to 100° C.

The film for heat-sensitive mimeograph stencils of the present invention has high heat-sensitivity, so that the printed characters and the paint-printed symbols and figures are clear and substantially free from unevenness in thickness and from light and shade. Further, since it is not necessary to make the film very thin, breaking and wrinkling of the film in the production process are unlikely to occur, so that the production yield of the film is high. Moreover, the film has excellent durability, so that the ease of handling of the film is excellent.

BEST MODE FOR CARRYING OUT THE INVENTION

The term "heat-sensitive mimeograph stencil" herein mean those which may be processed by the well-known method disclosed, e.g., in Japanese Patent Publication (Kokoku) No. 7623/66 using flash irradiation with a xenon lamp or using a thermal head, and which comprises a film for forming a heat-sensitive mimeograph stencil (hereinafter referred to as "heat-sensitive film" for short) and a porous support to which the heat-sensitive film is adhered.

As stated above, the heat-sensitive film of the present invention is made of a polyester-based film. The term "polyester" herein means polyester containing as the major acid component an aromatic dicarboxylic acid and as the major glycol component an alkyleneglycol.

Examples of the aromatic dicarboxylic acid may include terephthalic acid, isophthalic acid, naphthalenedicarboxylic acid, diphenoxyethanedicarboxylic acid, diphenyldicarboxylic acid, diphenyletherdicarboxylic acid, diphenylsulfondicarboxylic acid and diphenylketonedicarboxylic acid. Among these, the most preferred is terephthalic acid.

Examples of the alkyleneglycol may include ethyleneglycol, 1,4-butanediol, trimethyleneglycol, tetramethyleneglycol, pentamethyleneglycol and hexamethyleneglycol. Among these, the most preferred is ethyleneglycol.

The polyester may preferably be a copolymer. Examples of the copolymerizable component may include diol components such as diethyleneglycol, propyleneglycol, neopentylglycol, polyalkyleneglycol, p-xylyleneglycol, 1,4-cyclohexanedimethanol, 5-sodium sulforesorcin; dicarboxylic acid components such as adipic acid, sebacic acid, phthalic acid, isophthalic acid, 2,6-naphthalenedicarboxylic acid and 5-sodium isophthalic acid; polyfunctional dicarboxylic acid components such as trimellitic acid and pyromellitic acid; and oxycarboxylic acid components such as p-oxyethoxybenzoic acid. The content of such a copolymerizable component in the polyester may preferably be 2–23 mol %, and more preferably 7–18 mol %.

The polyester may contain well-known additives for polyester films such as antistatic agents and thermal stabilizers in such an amount that the advantageous properties of the film are not degraded.

The heat-sensitive film of the present invention must be a biaxially stretched film. Uniaxially stretched film and non-stretched film may give uneven perforation. Although the degree of biaxial stretching is not limited, it is usually 2.0–7.0 times, preferably 3.5–6.5 times the original length in both the longitudinal and transvers directions. -

The heat-sensitive film of the present invention has an energy of crystal fusion ΔHu of 3–11 cal/g, preferably 5–10 cal/g. If the ΔHu is less than 3 cal/g, the heat-sensitive film may stick to the original copy (manuscript) and clear characters may not be printed. If the ΔHu is more than 11 cal/g, paint-printing characteristics, sensitivity and the expression of light and shade may be degraded. It should be noted that if the ΔHu is not more than 10 cal/g, the perforation time may be shortened so that productivity may be promoted.

In the heat-sensitive film of the present invention, the difference in the temperature ΔTm between the fusion terminating point and the fusion starting point is 50° C. to 100° C., and preferably 60° C. to 90° C. If the ΔTm is less than 50° C., the paint-printing is unclear and has light and shade, so that the object of the present invention cannot be attained. On the other hand, if the ΔTm is more than 100° C., the thickness of the printed characters is uneven. It should be noted that if the ΔTm is less than 90° C., the dimensional change of the paint-printed symbols or figures from those in the original copy may be reduced.

In a preferred mode of the present invention, the center line average roughness (Ra) is 0.05–0.3 μm, more preferably 0.09–0.25 μm. If the center line roughness is in the above-mentioned range, winding the film in the production process may be satisfactorily conducted without making folded wrinkles and the transparency of the film is excellent, so that the sensitivity of the film may be further improved.

Further, in a preferred mode of the present invention, the heat-sensitive film has a maximum roughness (Rt) of 0.5–4.0 μm, more preferably 0.8–3.5 μm. If the maximum roughness is in this range, the winding characteristic of the film in the production process is good and the film is hardly broken in the production process.

Further, in view of the preferred slipperiness, transparency and sensitivity, the heat-sensitive film of the present invention preferably has 2,000 to 10,000 projections, more preferably 2,500 to 8,000 projections per 1 $mm^2$.

Still further, in view of the preferred slipperiness, winding characteristic and productivity, the heat-sensitive film of the present invention preferably has 20 to 1,000, more preferably 50 to 800 projections per 1 $mm^2$, which projections have a diameter of 8–20 μm.

The above-mentioned specific surface configuration, that is, the specific roughness and the projection density may be obtained by blending in the film particles made of an oxide or an inorganic salt of an element belonging to any of the IIA group, IIIB group, IVA group or IVB group in the periodic table by the method hereinafter described. Examples of the materials constituting the particles may include synthesized and naturally occurring calcium carbonate, wet silica (silicon dioxide), dry silica (silicon dioxide), aluminum silicate (kaolinite), barium sulfate, calcium phosphate, talc, titanium dioxide, aluminum oxide, aluminum hydroxide, calcium silicate, lithium fluoride, calcium fluoride and barium sulfate. Among these, those inorganic particles with a Mohs' hardness of 2.5 to 8 are especially preferred because the plating characteristics may be improved. Examples of such particles include calcium carbonate, titanium dioxide, silica, lithium fluoride, calcium fluoride and barium sulfate. These inactive particles preferably have an average particle size of 0.1–3 μm. It is especially preferred that the particles have an average particle size of 0.5–2.5 times the film thickness because the plating characteristics may be further improved. Although the content of the inactive particles varies depending on the material of the particles and the particle size, as usual, it is preferably 0.05–2.0% by weight, more preferably 0.1–1.0% by weight for forming the above-described specific surface configuration. In a preferred mode of the present invention, the heat-sensitive film of the present invention contains therein at least one higher aliphatic substance of which a major component is a $C_{10}$–$C_{33}$, more preferably a $C_{20}$–$C_{32}$ higher aliphatic monocarboxylic acid or an ester thereof. By incorporating such a substance in the film, the printing sensitivity and the expression of light and shade may further be improved.

Preferred examples of the $C_{10}$–$C_{33}$ higher aliphatic monocarboxylic acid may include capric acid, lauric acid, stearic acid, nonadecanoic acid, arachic acid, behenic acid, melissic acid, lignoceric acid, cetolic acid, montanic acid, hentriacontanoic acid, petroselinic acid, oleic acid, erucic acid, linoleic acid and mixtures thereof.

The term "higher aliphatic monocarboxylic acid ester" herein means those obtained by esterifying the whole or a part of the carboxylic group of the above-mentioned higher aliphatic monocarboxylic acid with a monovalent or divalent $C_2$–$C_{33}$, preferably $C_{18}$–$C_{33}$, more preferably $C_{20}$–$C_{32}$ aliphatic alcohol. Preferred examples of the higher aliphatic monocarboxylic acid ester may include montanic acid ethyleneglycol ester, ethyl montanate, ceryl montanate, octacosyl lignocerate, myricyl cerotate and ceryl cerotate, as well as naturally occurring montanic wax, carnauba wax, beads wax, candelilla wax, bran wax and insect wax.

The term "major component" herein means the component is contained in the amount of 50% by weight or more.

The content of the higher aliphatic substance in the film may preferably be 0.005–5% by weight, more preferably 0.01–3% by weight based on the weight of the polyester.

The heat-sensitive film of the present invention preferably has a thickness of 0.2–10 μm, more preferably 0.3–7 μm. If the thickness of the film is in this range, wrinkles are hardly made in winding, adhesion with the porous support is easy and the pirinting durability is high.

It is preferred that the total of the heat shrinkage in the longitudinal and transverse directions of the film at 150° C. be 6–33%, more preferably 10–24%. In this case, it is preferred that the ratio of the heat shrinkage in the transverse direction to that in the longitudinal direction be 0.75 to 1.25 for preferred processing characteristics.

Further, it is preferred that the total of the thermal stress in the longitudinal and transverse directions at 80° C. and 90° C. be 0–200 g/$mm^2$ and 250–1,000 g/$mm^2$, respectively for preferred processing characteristics.

The heat-sensitive film of the present invention may be produced by the following process. The above-described polyester or polyester copolymer or a mixture thereof, which contains, if necessary, the above-described specific inorganic particles and/or higher aliphatic substance is supplied to an extruder, and molten polymer may then be extruded through a T-die, and cast onto the cooling drum. The obtained film is then biaxially stretched to obtain the heat-sensitive film of the present invention. The biaxial stretching is, although not restricted, usually conducted under a temperature between the glass transition temperature (hereinafter referred to as "Tg") of the film and Tg+50° C., at a stretching ratio of 2.0–7.0 times the original dimension in both the longitudinal and transverse directions. More preferably, the film may be stretched in the longitudinal direction at a stretching ratio of 3.5–6.5 times the original length at a temperature of 90° C. to 115° C. and then stretched in the transverse direction at a temperature of 90° C. to 120° C. The method of biaxial stretching is not restricted and successive biaxial stretching and simultaneous stretching (stenter method or tube method) may be employed. The thus obtained film may be heated at a temperature between (melting point −10° C.) to (melting point −120° C.) with 0–20% relaxation. For preferred processing characteristics, it is most preferred to heat the film at 110° C. to 180° C. with 0–9% relaxation.

In cases where the above-mentioned inorganic particles are incorporated in the film in order to obtain the above-described specific surface configuration, it is preferred to prepare a master polymer comprising the inorganic particles in a polyester or a polyester copolymer and to admix the master polymer with the polyester or the polyester copolymer which is the major component of the film, since the processing characteristics may be further improved. In this case, it is preferred to employ as the master polymer a polyester or a polyester copolymer which has a melting point of 10° C. to 100° C. higher than that of the major component polymer and/or which has an intrinsic viscosity (IV) of 0.2 to 1.0 higher than that of the major component polymer, and which has some compatibility with the major component polymer for obtaining the specific surface configuration. Needless to say, the surface configuration may be controlled to some degree by controlling the shearing stress exerted in the extrusion step, weight per unit area of the filter, or extrusion conditions.

The heat-sensitive mimeograph stencil of the present invention may be obtained by laminating and adhering the heat-sensitive film of the present invention on a porous support. Representative examples of the porous support include porous tissue paper, tengjo paper, synthetic fiber paper, various woven fabrics and non-woven fabrics. Although the weight per unit area of the porous support is not restricted, it is usually 2–20 $g/m^2$, preferably 5–1.5 $g/m^2$. In cases where a mesh sheet is used as the porous support, those mesh sheets which are woven with fibers having a diameter of 20–60 μm, and which have a lattice interval of 20–250 μm may preferably be employed for preferred printing characteristics.

Representative examples of the adhesive used for adhering the heat-sensitive film and the porous support include vinyl acetate-based resins, acrylic resins, urethane-based resins and polyester-based resins.

In a preferred mode of the heat-sensitive mimeograph stencil of the present invention, a non hot-sticking layer is formed on the surface of the heat-sensitive film which surface is opposite to the surface contacted with the porous support. The non hot-sticking layer is formed in order to prevent the heat-sensitive film from sticking to the original copy in case of processing by flash irradiation or to a thermal head in case of processing with the thermal head. Since the sticking of the heat-sensitive film with the thermal head is severe, the heat-sensitive mimeograph stencil which is to be processed with the thermal head is especially preferred to have the non hot-sticking layer.

The non hot-sticking layer may be made of a thermosetting or a non-fusible substance, which is not fused by heating at all. Examples of such a substance include thermosetting silicone resins, epoxy resins, melamine resins, phenol resins, thermosetting acrylic resins and polyimide resins.

As the material constituting the non hot-sticking layer, those substances which are liquefied at room temperature or under heat to prevent the sticking, such as metal salts of fatty acids, polysiloxane and fluorine oil may preferably be employed. Among these, those substances which are solid at room temperature and are liquefied under heat, which, upon cooling to a temperature lower than the melting point, remain as liquid are especially preferred. Examples of such a substance include dicyclohexyl phthalate, diphenyl phthalate, triphenyl phosphate, dimethyl fumarate, benzotriazole, 2,4-dihydroxybenzophenone, tribenzylamine, benzil, phthalophenone, p-toluensulfonamide and polyethyleneglycol.

The non hot-sticking layer may also preferably be made of a substance excelling in releasing properties. Examples of such a substance include fluorine-contained polymers, silicone resins, perfluoroacrylic resins, vinyl chloride resins and vinylidene chloride resins.

Further, for preferred adhesiveness with the polyester resin and of transcription to the reverse side when stored in rolled state, also preferred are a non hot-sticking layer consisting essentially of a mixture of (A) cross-linked polyester copolymer and (B) organopolysiloxane, which has a (B)/(A) weight ratio of 0.01 to 8, and a non hot-sticking layer containing not less than 10% by weight of cured substance consisting essentially of an urethane prepolymer (A) having organopolysiloxane as its principal chain, which has a free isocyanate group as a terminal group and/or pendant group. Especially preferred non hot-sticking layer consists essentially of a cured substance containing an urethane prepolymer (A) having organopolysiloxane as its principal chain, which has a free isocyanate group as a terminal group and/or pendant group and a polymer (B) having an active hydrogen atom, the weight ratio of (A)/(B) being 10/90 to 90/10. These non hot-sticking layers will now be described in more detail.

In the non hot-sticking layer containing not less than 10% by weight of cured substance consisting essentially of an urethane prepolymer (A) having organopolysiloxane as its principal chain, which has a free isocyanate group as a terminal group and/or pendant group, the prepolymer (A) may be synthesized by blending the compound represented by the following formula (1) or (2) with an organic isocyanate in excess amount with respect to the number of the active hydrogens in the compound (1) or (2):

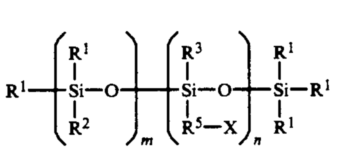
(1)

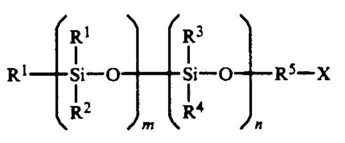
(2)

(wherein $R^1$–$R^4$, the same or different, represent methyl group or phenyl group; $R^5$ represents oxyalkylene group, polyoxyalkylene group or mercapto group; X represents hydroxide group; and m and n, the same or different, represent an integer of 3-200). As the organic polyisocyanate, known aromatic, alicyclic or aliphatic polyisocyanates may be used. Glycols, polyols and water may be used as a chain elongating agent.

The synthesized urethane prepolymer (A) has free isocyanate group of which content is 1-10% by weight, preferably 1-7% by weight. Since the free isocyanate group is very reactive, those prepolymers of which isocyanate group is blocked by a blocking agent may preferably be used. The blocked urethane prepolymer (A) may stably be dispersed in water. Examples of the blocking agent include ethyleneimine, lactams, oximes, phenols and hydrogensulfite and these blocking agents may preferably be selected depending on the heat-curing conditions. In usual, those blocking agents which dissociate at 100° C.-180° C. are preferred. In this case, upon heating, the blocking agent dissociates to cross-link and cure the urethane prepolymer (A), so that the urethane prepolymer (A) can accomplish its role as a non hot-sticking layer. More preferably, the urethane prepolymer (A) is mixed with a polymer (B) having active hydrogen atoms to promote the adhesivity with the heat-sensitive film and to prevent the transcription of the hot-sticking layer to the reverse side.

The polymer (B) having active hydrogen atoms may be any polymer which contains active hydrogen atoms in the polymer molecule. Examples of the group containing the active hydrogen atom include hydroxide group, amino group and mercapto group, and examples of the polymer containing such a group include polyester resins, polyamide resins, polyesterether resins, polyesteramide resins, polyetheramide resins, polyvinylalcohol resins, epoxy resins, melamine resins, urea resins, celluloses, methylols, as well as acrylic resins, phenol resins, silicone resins, polyurethane resins, which contain amino group, hydroxide group or carboxyl group, and modified resins thereof.

It is preferred that the urethane prepolymer (A) be contained in the non hot-sticking layer in the amount of not less than 10% by weight. As stated above, by blending a polymer (B) with the prepolymer (A), advantageous effects may be brought about. In this case, the mixing ratio of the prepolymer (A) to polymer (B) by weight may preferably be 10/90 to 90/10, more preferably 20/80 to 80/20 for further promoting the adhesiveness with the heat-sensitive film and the prevention of the transcription to the reverse side.

In the mixture of the prepolymer (A) and the polymer (B), various surface active agents may be incorporated in an amount not to degrade the properties of the non hot-sticking layer, and heat-resisting agents, weather-resisting agents, coloring agents, lubricants and the like may also be incorporated. Further, to enhance the dissociation of the blocking agent from the blocked isocyanate, a basic compound may be incorporated to adjust the pH. To promote the reactivity of the free isocyanate, a known catalyst such as dibutylstannicdilaurate may also be added.

In cases where the non hot-sticking layer is made of a mixture of cross-linked polyester copolymer (A) and organopolysiloxane (B), the cross-linked polyester copolymer (A) may be those obtained by blending a polyester with a known cross-linking agent which reacts with a carboxyl group or hydroxide group at the terminal of the polyester to cross-link the polyester and then heating or irradiating the polyester with an ultraviolet beam or electron beam. Alternatively, the cross-linked polyester copolymer may be one obtained by introducing a reactive group into the polyester copolymer and then self-cross-linking the polyester copolymer with or without using. a cross-linking agent.

The polyester copolymer which is to be cross-linked may be any polyester copolymer containing a carboxyl group or hydroxide group, which is obtained by polycondensing a dicarboxylic acid component and a glycol component.

The dicarboxylic acid component may be an aromatic, aliphatic and alicyclic dicarboxylic acid and examples of the carboxylic acid component may include terephthalic acid, isophthalic acid, ortho-phthalic acid, 2,6-naphthalenedicarboxylic acid, adipic acid, sebacic acid, succinic acid, glutaric acid, 1,3-cyclopentanedicarboxylic acid, 1,3-cyclohexanedicarboxylic acid, dodecanedicarboxylic acid and azelaic acid. Further, a sulfonic acid metal salt-containing dicarboxylic acid may be employed as a copolymerization component in order to give water-solubility or water-dispersibility to the polyester copolymer. Examples of the sulfonic acid metal salt-containing dicarboxylic acid include metal salts of sulfoterephthalic acid, 4-sulfonaphthalene, 2,7-dicarboxylic acid and 5[4-sulfophenoxy]isophthalic acid.

The glycol component which is to be reacted with the dicarboxylic acid may be a $C_2$-$C_8$ aliphatic glycol or a $C_6$-$C_{12}$ alicyclic glycol. Examples of the glycols may include ethyleneglycol, 1,2-propyleneglycol, 1,3-propanediol, 1,4-butanediol, neopentylglycol, 1,6-hexanediol, 1,2-cyclohexanedimethanol, 1,3-cyclohexanedimethanol, p-xylyleneglycol, diethyleneglycol and triethyleneglycol. As a part of the glycol component, polyethyleneglycol or polytetramethyleneglycol may be employed.

The polyester copolymer obtained from the above-mentioned dicarboxylic acid component and the glycol component may be used in the form of solution or dispersion in water, in an organic solvent, or in a mixture of water and an organic solvent.

The polyester copolymer preferably has a number of terminal groups for preferred cross-linking property, and those having a hydroxide value of 3-200 mg KOH/g polymer, especially 5-100 mg KOH/g polymer are preferred in view of the reactivity and the stiffness of the coated film. The polyester copolymer preferably has a glass transition point of 10° C. to 90° C., more preferably 40° C. to 70° C. for preferred anti-sticking property.

As to the cross-linking agent for cross-linking the polyester copolymer, this may be any one which reacts with the terminal carboxyl group or hydroxide group. Representative examples of the cross-linking agent may include urea type, melamine type and acrylamide type polymer or prepolymer containing methylol or alkylol group, epoxy compounds, isocyanate compounds and aziridine compounds. Among these, for preferred adhesiveness with the heat-sensitive film and the non hot-sticking property, methylolmelamine and isocyanate compounds are preferred. Although the amount of the cross-linking agent added may appropriately be selected depending on the nature of the employed cross-linking agent, it is usually preferred to add equivalent cross-linking agent with respect to the terminal groups. Usually, the cross-linking agent may preferably be used in the amount of 2 to 30 parts, more preferably 5 to 20 parts by weight with respect to 100 parts by weight of the polyester copolymer in terms of solid contents.

The polyester copolymer in which a reactive group is introduced is one in which the following compounds having a functional group such as reactive group, self-cross-linking group and hydrophilic group is introduced into the stem polymer. Examples of the compounds containing carboxyl group, its salt or acid anhydride group may include acrylic acid, methacrylic acid, itaconic acid, maleic acid, fumaric acid and crotonic acid. Examples of the compounds containing amide group or methylolated amide group may include acrylamide, methacrylamide, N-methylmethacrylamide, methylolacrylamide, methylolated methacrylic amide, ureidovinyl ether, $\beta$-ureidoisobutylvinyl ether and ureidoethylacrylate. Examples of the compounds containing hydroxide group may include $\beta$-hydroxyethylmethacrylate, $\beta$-hydroxypropylacrylate, $\beta$-hydroxypropylmethacrylate, $\beta$-hydroxyvinyl ether, 5-hydroxypentylvinyl ether, 6-hydroxyhexylvinyl ether, polyethyleneglycolmonoacrylate, polyethyleneglycolmonomethacrylate, polypropyleneglycolmonoacrylate and polypropyleleglycolmonomethacrylate. Examples of compounds containing epoxy group may include glycidylacrylate and glycidylmethacrylate.

Among these compounds containing a reactive group, for preferred adhesiveness with the heat-sensitive film and anti-sticking property, acrylic acid and grafted compound of the methylolated acrylamide are especially preferred.

Although the polyester copolymer containing the reactive group may be cross-linked by heating or the like after coating, it is preferred to employ a cross-linking catalyst for enhancing the cross-linking reaction. Examples of the cross-linking catalyst may include ammonium chloride, ammonium nitrate, citric acid, oxalic acid, p-toluenesulfonic acid and dialkylzinc complex. The amount of the cross-linking catalyst may be 0.5-5 parts by weight, preferably 1-3 parts by weight with respect to 100 parts by weight of the polyester copolymer in terms of solid contents.

As the above-mentioned organopolysiloxane (B) employed along with the cross-linked polyester copolymer may be silicone oils and modified silicone oils in which various functional groups are introduced for the purpose of conferring compatibility with the resin to be blended, hydrophilicity, reactivity, adsorbing ability, lubricating ability and so on. Representative examples of the organopolysiloxanes to be employed may include those represented by the following formulae (3) to (5).

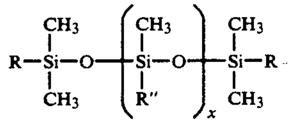
(3)

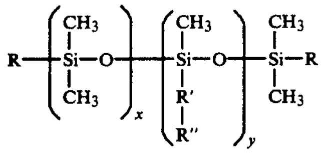
(4)

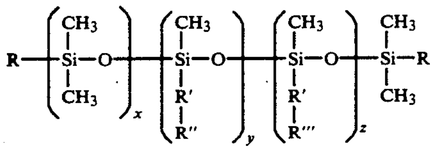
(5)

(wherein x, y and z, the same or different, represent an integer of 1 to 5,000; R represents $C_1$-$C_{100}$ alkyl group or hydroxide group; R' represents $C_1$-$C_{10}$ alkylene group, phenylene group, cyclohexylene group or ether group; R" represents hydrogen, $C_1$-$C_{100}$ alkyl group, epoxy group, amino group, carboxyl group, phenyl group, hydroxide group, mercapto group, polyoxylenealkyl group or halogen-containing alkyl group; R'"represents $C_1$-$C_{100}$ alkyl group, polyoxylenealkyl group, hydroxide group or halogen-containing alkyl group).

Preferred examples of the organopolysiloxanes represented by the formulae (3) to (5) may include dimethylpolysiloxane oils, amino-modified silicone oils, epoxy-modified silicone oils, epoxy-polyether-modified silicone oils, epoxypolyether-modified silicone oils, carboxyl-modified silicone oils, polyether-modified silicone oils, alcohol-modified silicone oils, alkyl- or alkylaralkyl-modified silicone oils, alkylaralkyl-polyether-modified silicone oils, fluorine-modified silicone oils, alkyl-higher alcohol ester-modified silicone oils, methylhydrogenpolysiloxane oils, phenylmethylsilicones and emulsions thereof.

Among these, in view of the anti-sticking property and noise prevention property, dimethylpolysiloxane oils, epoxy-modified silicone oils, epoxy-polyether-modified silicone oils, polyether-modified silicone oils and amino-modified silicone oils, as well as the emulsion thereof are preferred. Mixtures of two or more of these with any mixing ratio may be employed. Further, known cross-linking agents which react with the reactive groups of the silicone oil may also be used.

For example, it is preferred to use a compound such as amine, amide and melamine along with the silicone oil having an epoxy group since the elimination of the oil may be reduced.

The organopolysiloxanes suitable for employing in the non hot-sticking layer have a viscosity of 100-5,000,000 centistokes, more preferably 2,000-3,000,000 centistokes at 25° C.

Although cross-linkable polyester copolymer (A) and the organopolysiloxane (B) may be admixed in any mixing ratio using a common organic solvent or water the mixing ratio (B)/(A) by weight may preferably be 0.01-8, more preferably 0.05-3, still more preferably 0.1-0.7.

Although the thickness of the non hot-sticking layer is not restricted, it may preferably be 0.01-1 $\mu$m, more preferably 0.05-0.5 $\mu$m.

For adhesiveness with the heat-sensitive film and for prevention of the transcription to the reverse side, the non hot-sticking layer may be formed by applying a solution of the compounds on the heat-sensitive film, stretching the heat-sensitive film while drying the applied solution and then heatsetting the resulting film.

Methods and various characteristics relating to the present invention and methods of evaluating the effects of the present invention will now be described in summary.

(1) Energy of Crystal Fusion [$\Delta$Hu (cal/g)]

The energy of crystal fusion was obtained from the area (a) of a region in the thermogram of the heat-sensitive film while the fusion takes place, using a differential scanning thermometer type DSC-2 manufactured by Perkin-Elmer Co., Ltd. The region was that interposed between the base line of the thermogram and the differential thermal curve in the range from the fusion-starting temperature to the fusion-terminating temperature. That is, the differential thermal curve deviates from the base line to the endothermic side as the heating continues and then returns to the base line. The area (a) is that of the region interposed between the deviated differential thermal curve and the straight line connecting the point at which the deviation of the differential thermal curve begins and the point at which the deviated curve returns to the base line. The same procedure was followed for indium to obtain the corresponding area (b) which is known as 6.8 cal/g. The energy of fusion was obtained by the following equation: $a/b \times 6.8 = \Delta Hu$ (cal/g)

(2) Difference Between the Fusion-Starting Temperature and Fusion-Terminating Temperature ΔTm (°C.)]

Using the differential scanning thermometer type DSC-2 as in (1), the temperature at which the differential thermal curve begins to deviate from the base line was defined as the fusion-starting temperature ($T_1$) and the temperature at which the deviated differential thermal curve returns to the base line was defined as fusion-terminating temperature ($T_2$), and the ΔTm was obtained by the equation $T_2 - T_1 = \Delta Tm$ (°C.). In cases where the position of the each base line is difficult to clearly define, tangent line was drawn for each base line and the points at which the differential thermal curve starts to deviate, and returns to each tangent line were read. In cases where ΔHu =0 cal/g, ΔTm is defined as ∞.

(3) Evaluation of Character Printing (i) Evaluation of Clearness of Characters

The original copy (manuscript) carried JIS first level characters in the size of 2.0 mm square. Mimeograph stencil comprising a porous support made of polyester gauze and a heat-sensitive film adhered thereto was processed using a mimeographing printer "RISO Meishigokko" (manufactured by Riso Kagaku Kogyo K.K.) and the printed characters were evaluated. By the evaluation, the mimeograph stencils were classified into three ranks. The A rank mimeograph stencils are those by which characters were printed as clear as the original copy. The B rank stencils are those which gave characters whose lines, unlike the original copy, were cut and/or combined although which characters could be read. The C rank stencils are those which gave characters of which the lines were cut and/or combined such that the characters could not be read (ii) Evaluation of Chipping of Characters Processing and printing were conducted as in (i) just described above, and the chipping of the characters were evaluated. Those mimeograph stencils which gave characters clearly chipping were evaluated unacceptable and are expressed by the mark "X" in the tables. Those which gave characters which did not chip at all were evaluated as acceptable and are expressed by the mark "◯" in the tables. Those which gave characters slightly chipping but could be read are expressed by the mark "Δ".

(iii) Evaluation of Unevenness of Thickness of Character Lines

By the same manner as in (i), characters with a size of 5.0 mm square were printed, and the printed characters were subjected to visual examination.

Those mimeograph stencils by which characters clearly showing unevenness of the lines thereof when compared with the original copy (manuscript) were printed were evaluated as giving bad appearance and unacceptable, and are expressed by the mark "X". Those which gave characters not showing unevenness of the lines thereof were evaluated as giving good appearance and acceptable, and are expressed by the mark "◯".

(iv) Evaluation of Thickness of Lines of Characters

Characters were printed in the same manner as in (iii), the change in the thickness of the lines of the characters from the original copy were visually examined. Those mimeograph stencils by which characters whose lines were thickened or thinned when compared to the original copy were printed were evaluated as unacceptable and are expressed by the mark "X". Those which gave characters of which lines did not change in the thickness are expressed by the mark "◯". Those characters of which lines were slightly thickened or thinned but in an acceptable level are expressed by the mark "Δ".

(4) Evaluation of Paint-Printing (i) Evaluation of Clearness of Paint-Printing

● (circles painted in black) with a diameter of 1-5 mm were printed in the same manner as described above. The printed circles were subjected to evaluation.

The evaluation was made for the ruggedness of the boundaries of the circles. Those mimeograph stencils which gave circles whose boundaries have a portion which projects or recesses by 200 μm or more with respect to the size of the original copy were evaluated as giving bad appearance and unclear printing, and are expressed by the mark "X". Those which gave circles having a projection or a recess of 50 μm or smaller were evaluated as being clear and are expressed by the mark "◯". Those which were intermediate therebetween are expressed by the mark "Δ". These can be acceptable for some use.

(ii) Correspondence of the Size of Original Copy and Paint-Printed Copy

Circles painted in black were printed as in (i), and the diameters of the painted circles in various directions (i.e., 0° and 180°, 45° and 225°, 90° and 270°, and 135° and 315°) were measured. Those which gave printed circles showing a dimensional change from the original copy (larger or smaller) by not less than 500 μm were evaluated as giving bad correspondence and are expressed by the mark "X". Those which gave printed circles which showed a dimensional change of not more than 50 μm were evaluated as giving good correspondence and are expressed by the mark "◯". Those which were intermediate therebetween are expressed by the mark "Δ". These can be acceptable for some use.

(iii) Evaluation of Light and Shade Shown in Paint-Printing

Paint-printing was conducted as in (i), and the printed circles were visually checked whether they have light and shade or not. Those mimeograph stencils which gave printed circles showing light and shade are expressed by the mark "X" and those not showing light and shade are expressed by the mark "◯".

Evaluation of Sensitivity

Characters were written with pencils having a pencil hardness of 5H, 4H, 3H, 2H and H at a pressing force of 150 g and were used as a manuscript. The sensitivity was evaluated whether the printed characters were able to be read. Since the character written with a pencil of 5H was the lightest and the character written with a pencil of H was the deepest, the sensitivity was the highest if the printed character of which manuscript was written with a pencil of 5H could be read and the sensitivity decreases as the highest pencil hardness by which readable printed character could be made shifts from 5H to H.

(6) Evaluation of Durability

The durability was expressed in terms of the number of prints (known as withstand printing number) which could be printed until the heat-sensitive film was broken using the above-mentioned printer.

(7) Center Line Average Roughness (Ra)

The center line average roughness (Ra) was measured in accordance with the method of JIS B 0601 using a pin-touch type surface roughness meter. The cutoff was 0.25 mm and the measuring length was 4 mm.

(8) Maximum Roughness (Rt)

The maximum roughness was measured using a pin-touch type surface roughness meter in accordance with the method of JIS B 0601. The maximum roughness means the total of the height of the highest mountain and the depth of the deepest valley wherein the measuring length was 4 mm.

(9) Diameter and Number of Projections

Aluminum was vapor-deposited with a thickness of about 100 nm on the films to prepare film samples for observation. Using a microscope (reflection method) and an image analyzing computer (Cambridge Instrument Co., Ltd.), the samples were magnified to 358 magnifications and were provided with contrast, and the size (diameters) and the number of the projections were measured. The area occupied by the projection was calculated in terms of area of a circle, and the size of the projections were expressed in terms of the diameter of the circle.

(10) Average Particle Size

Slurry of the inorganic particles in ethanol was prepared and the average particle size was determined using a centrifugal sedimentation type particle size distribution-measuring apparatus CAPA-500 (manufactured by Horiba Seisakusho).

(11) Stretching Property

Evaluation was made for whether the film is broken or not by being stretched in transverse direction in a stenter. Those films which were broken within 8 hours were evaluated as having bad stretching property and were expressed by the mark "X". Those films which was not broken within 72 hours were evaluated as having good stretching property and were expressed by the mark "○". Those films which were broken at the time of 8 hours to 72 hours from the beginning of the stretching were evaluated as being practically acceptable although the productivity would be lowered, and were expressed by the mark "Δ".

(12) Winding Property

The conditions of the films when they were wound about a winder were visually examined. The criteria of the evaluation were as follows: Mark ◎: Those films which did not show folded wrinkles, longitudinal wrinkles which did not reach to folded wrinkles, transverse wrinkles which did not reach to folded wrinkles and side slips (0.5 mm or less) at all were evaluated as having good winding property and were expressed by the mark "◎". Mark ○: Those films which showed longitudinal and/or transverse wrinkles which did not reach to folded wrinkles, but which did not bring about troubles in rewinding step and in adhering step, as well as those which showed a side slip of 1.0 mm or less were evaluated as being practically usable and were expressed by the mark "○". Mark X: Those films which showed folded wrinkles and which showed longitudinal and/or transverse wrinkles not reaching to folded wrinkles but brought about troubles in rewinding step and in adhering step, as well as those which showed a side slip of more than 1.0 mm were evaluated as being practically unusable and were marked as "X".

(13) Heat Shrinkage

Films were cut into 1 cm width×30 cm length to prepare film samples. The point at 5 cm from the edge of the sample was marked and the point at 20 cm from the mark was also marked. Three grams of load was applied to the edge of the sample and the sample was heat-treated at 150° C. for 15 minutes in "Perfect Oven" manufactured by Tahai Co., Ltd. After the heat-treatment (HT), the distance between the marks was measured. The heat shrinkage (HS) was obtained from the following equation:

$$HS = \frac{20\text{ cm} - (\text{Distance between the Marks after } HT)}{20\text{ cm}} \times 100$$

(14) Adhesiveness

The adhesiveness between a polyester gauze used as the porous support and the heat-sensitive film was evaluated. Cellophane tapes were adhered to the surfaces of the polyester gauze and the heat-sensitive film, respectively, and the cellophane tapes were pulled off. Those from which the polyester gauze was completely pulled off were evaluated as having poor adhesiveness and were expressed by the mark "X", and those from which the polyester gauze was not pulled off at all were evaluated as having good adhesiveness and were expressed by the mark "○". Those in which the polyester gauze was partly pulled off were expressed by the mark "Δ".

(15) Releasing Property

Ease of detaching the manuscript from the heat-sensitive mimeograph stencil after processing was evaluated. Those from which the manuscript could be detached without any resistance were evaluated as having good releasing property and were expressed by the mark "○". Those to which the manuscript was kept attached but from which the manuscript could be detached without leaving any deffect on the processed region were evaluated, although the ease of handling was reduced as practically usable and were expressed by the mark "Δ". Those in which a deffect is left on the processed region when detaching the manuscript therefrom, as well as those in which the heat-sensitive film was broken were evaluated as unusable and were expressed by the mark "X".

(16) Evaluation of Anti-Curling Property

The heat-sensitive mimeograph stencils after being processed with the above-mentioned printer were evaluated. The mimeograph stencils after processing were cut into 5 cm×8 cm, and the thus cut stencils were placed on a flat desk with facing the heat-sensitive film upside. Those which did not curl at all were evaluated as having good anti-curling property and were expressed by the mark "◯". Those which were lifted by 10 mm or more were evaluated as having poor anti-curling property and were expressed by the mark "X". Those intermediate therebetween were expressed by the mark "Δ".

(17) Evaluation of Anti-Sticking Property

Using Risograph 007D III N with a thermal head, reading of a manuscript and perforative writing and printing were conducted. Those which did now show sticking at all during the operation were evaluated as having good anti-sticking property and were expressed by the mark "◎". Those which showed slight sticking but did not have a practical problem were expressed by the mark "◯", and those which showed sticking are expressed by the mark "X".

(18) Evaluation of Noise

Perforation operation was conducted as in (17) and the noise made in the operation was evaluated. Those which made noise are expressed by the mark "X", and those which did not make noise are expressed by the mark "◯".

(19) Surface Wetting Tension

To evaluate the transcription of the non hot-sticking layer to the reverse surface, a non hot-sticking layer was superposed on a bare heat-sensitive film and a pressure of 100 g/cm$^2$ was applied thereto. The thus superposed structure was left to stand at a temperature of 40° C., and a relative humidity of 95% for two days. Thereafter the conditions of the non hot-sticking layer and the surface of the film contacted with the non hot-sticking layer were evaluated in accordance with the method of JIS K 6768. In cases where the transcription of the non hot-sticking layer to the surface of the heat-sensitive film does not occur or scarecely occurs, the surface wetting tension of the heat-sensitive film is assumed to be 38–43 dynes/cm. Thus, in cases where the surface wetting tension was not more than 37 dynes/cm, it is evaluated that the transcription of the non hot-sticking layer to the reverse side of the film when rolled is severe.

The present invention will now be described by way of examples and comparative examples thereof. The examples are presented for the illustration purpose only and should not be interpreted any restrictive way.

COMPARATIVE EXAMPLE 1

Polyethyleneterephthalate resin with an intrinsic viscosity (IV) of 0.6 was supplied to an extruder and was melt-extruded through a T-die at 280° C. The molten resin was cast onto a cooling drum with a temperature of 70° C. to form a cast film. The film was stretched to 4.5 times the original length at 90° C. in the longitudinal direction. The film was then stretched to three times the original length at 100° C. in transverse direction. The film was subsequently heatset under restraint in the stenter at 210° C. for 5 seconds to obtain a biaxially stretched film having the thickness of 2.0 μm.

The ΔHu and ΔTm of the thus obtained heat-sensitive film were measured. Further, the thus obtained heat-sensitive film was laminated on, and adhered to a polyester gauze and was subjected to printing using the printer, and character printing characteristics, paint-printing characteristics, sensitivity and withstand printing number were evaluated as mentioned above. The results are shown in Table 1.

EXAMPLES 1-5, COMPARATIVE EXAMPLE 2

The same procedure as in Comparative Example 1 was repeated except that the material used was ethyleneterephthalate-isophthalate copolymer. The content of the isophthalate of Examples 1–5 and Comparative Example 2 was 2.5, 5.0, 10, 15, 20 and 25% by weight, respectively. The thickness of the film was 2.0 μm. In Examples 4 and 5 and in Comparative Example 2, the temperature during the stretching in the longitudinal direction was 70° C. and the heat-treatment was conducted at 170° C. Other conditions were the same as in Comparative Example 1.

The ΔHu and ΔTm of the thus prepared heat-sensitive films were measured. Further, the thus obtained heat-sensitive films were laminated on, and adhered to a polyester gauze and was subjected to printing using the printer, and character printing characteristics, paint-printing characteristics, sensitivity and withstand printing number were evaluated as mentioned above. The results are shown in Table 1.

COMPARATIVE EXAMPLE 3

Polyethyleneterephthalate-isophthalate copolymer containing 25% by weight of isophthalate was blended in polyethyleneterephthalate resin in the amount of 70% by weight, and the same procedure as in Comparative Example 2 was repeated using this material to form a heat-sensitive film.

The ΔHu and ΔTm of the thus prepared heat-sensitive film was measured. Further, the thus obtained heat-sensitive film was laminated on, and adhered to a polyester gauze and was subjected to printing using the printer, and character printing characteristics, paint-printing characteristics, sensitivity and withstand printing number were evaluated as mentioned above. The results are shown in Table 1.

TABLE 1-1

| Example | ΔHu (cal/g) | ΔTm (°C.) | Characters Printing: Clearness | Chipping | Thickness | Unevenness of Thickness |
|---|---|---|---|---|---|---|
| Comparative Example 1 | 13 | 40 | A | × | × | ◯ |
| Example 1 | 11 | 50 | A | Δ | Δ | ◯ |
| Example 2 | 10 | 60 | A | ◯ | ◯ | ◯ |
| Example 3 | 7 | 80 | A | ◯ | ◯ | ◯ |
| Example 4 | 5 | 90 | A | ◯ | ◯ | ◯ |
| Example 5 | 3 | 100 | B | ◯ | Δ | ◯ |
| Comparative Example 2 | 0 | ∞ | C | Δ | × | × |
| Comparative | 5 | 120 | A | ◯ | × | × |

TABLE 1-1-continued

| Example | ΔHu (cal/g) | ΔTm (°C.) | Characters Printing: Clearness | Chipping | Thickness | Unevenness of Thickness |
|---|---|---|---|---|---|---|
| Example 3 | | | | | | |

TABLE 1-2

| Example | Paint-Printing: Clearness | Size Correspondence | Light and Shade | Sensitivity | Withstand Printing Number |
|---|---|---|---|---|---|
| Comparative Example 1 | × | × | × | H | 3000 |
| Example 1 | Δ | Δ | Δ | 3H | 2900 |
| Example 2 | ○ | ○ | ○ | 4H | 2750 |
| Example 3 | ○ | ○ | ○ | 5H | 2700 |
| Example 4 | ○ | ○ | ○ | 5H | 2695 |
| Example 5 | ○ | ○ | ○ | 5H | 2300 |
| Comparative Example 2 | × | × | ○ | 3H | 1000 |
| Comparative Example 3 | Δ | × | ○ | 3H | 2000 |

As is apparent from Table 1, the biaxially stretched films of the present invention of which ΔHu is in the range of 3–11 cal/g and of which ΔTm is in the range of 50°–100° C. are excellent in both character printing and paint-printing characteristics.

EXAMPLES 6–14

Ethyleneterephthalate-isophthalate copolymer (ethyleneisophthalate content of 12.5 mol %) with an intrinsic viscosity of 0.6 was blended with ethyleneterephthalate-isophthalate copolymer (ethyleneisophthalate content of 12.5 mol %) with an intrinsic viscosity of 0.7 containing 2.0% by weight of $SiO_2$ particles with an average particle size of 0.3 μm (Example 6), 1.1 μm (Example 7) or 2.0 μm (Example 8) in the amount such that the $SiO_2$ content at the time of melt-extrusion is 0.15% by weight.

As to Examples 9–13, polyethyleneterephthalate with an intrinsic viscosity of 0.6 containing $SiO_2$ particles with an average particle size of 0.1 μm (Example 9), 0.8 μm (Example 10), 1.3 μm (Example 11), 1:1 mixture of 2.0 μm and 3.5 μm (Example 12) or 1:1 mixture of 2.0 μm and 4.0 μm was blended with the above-mentioned ethyleneterephthalate-isophthalate copolymer used in Examples 6–8 in the amount such that the content of $SiO_2$ at the time of melt-extrusion was 0.25% by weight.

Using these materials, biaxially stretched films with a thickness of 1.5 μm were prepared as in Example 1.

The ΔHu, the ΔTm, the center line surface roughness, the maximum roughness and the number of projections were determined and the stretching property and the winding property were evaluated. Further, the thus obtained heat-sensitive films were laminated on, and adhered to a polyester gauze and was subjected to printing using the printer, and character printing characteristics, paint-printing characteristics, sensitivity and withstand printing number were evaluated as mentioned above. The results are shown in Table 2.

As is apparent from Table 2, by adopting the above-described specific surface configuration, heat-sensitive films which are excellent not only in printing characteristics, sensitivity and withstand printing number but also in stretching property and winding property can be obtained.

TABLE 2-1

| Example | ΔHu (cal/g) | ΔTm (°C.) | Ra (μm) | Rt (μm) | Number of Projections/$mm^2$: 1 μm φ or larger | 8–20 μm φ | Stretching Property | Winding Property | Characters Printing: Clear-ness | Chip-ping | Thick-ness | Unevenness of Thickness |
|---|---|---|---|---|---|---|---|---|---|---|---|---|
| Example 6 | 6.9 | 86 | 0.05 | 1.32 | 5812 | 267 | ○ | ○ | A | ○ | ○ | ○ |
| Example 7 | 6.7 | 85 | 0.10 | 2.09 | 5650 | 322 | ○ | ◎ | A | ○ | ○ | ○ |
| Example 8 | 6.5 | 84 | 0.20 | 2.55 | 5950 | 545 | ○ | ◎ | A | ○ | ○ | ○ |
| Example 9 | 7.0 | 86 | 0.08 | 0.5 | 6425 | 43 | ○ | ○ | A | ○ | ○ | ○ |
| Example 10 | 7.4 | 88 | 0.10 | 0.8 | 6213 | 53 | ○ | ◎ | A | ○ | ○ | ○ |
| Example 11 | 7.5 | 88 | 0.12 | 1.7 | 5900 | 101 | ○ | ◎ | A | ○ | ○ | ○ |
| Comparative Example 12 | 7.3 | 87 | 0.19 | 3.3 | 5321 | 113 | ○ | ◎ | A | ○ | ○ | ○ |
| Comparative Example 13 | 7.1 | 86 | 0.20 | 4.0 | 5153 | 210 | ○ | ◎ | A | ○ | ○ | ○ |

TABLE 2-2

| Example | Paint-Printing: Clear-ness | Size Corres-pondence | Light and Shade | Sensi-tivity | Withstand Printing Number |
|---|---|---|---|---|---|
| Example 6 | ○ | ○ | ○ | 5H | 2640 |
| Example 7 | ○ | ○ | ○ | 5H | 2600 |
| Example 8 | ○ | ○ | ○ | 5H | 2590 |
| Example 9 | ○ | ○ | ○ | 5H | 2690 |
| Example 10 | ○ | ○ | ○ | 5H | 2680 |
| Example 11 | ○ | ○ | ○ | 5H | 2550 |
| Comparative Example 12 | ○ | ○ | ○ | 5H | 2520 |
| Comparative Example 13 | ○ | ○ | ○ | 5H | 2480 |

EXAMPLES 14–18

To 100 parts by weight of ethyleneterephthalate-isophthalate copolymer with an isophthalate content of 22.5 mol % (Example 14), 20 mol % (Example 15), 17.5 mol % (Example 16), 15 mol % (Example 17) and 2.5 mol % (Example 18), 0.51 parts by weight of carubauna wax was added. Each material had an intrinsic viscosity of 0.6. Each material was supplied to an extruder and was melt-extruded through a T-die at 280° C. The molten resins were cast onto a cooling drum with a temperature of 50° C. to form cast films. The films were stretched to 4.5 times the original length at 70°-90° C. in the longitudinal direction. The films were then stretched to three times the original length at 80° C. in transverse direction. The films were subsequently heat-treated in the stenter at 150° C. for 5 seconds to obtain biaxially stretched films having a thickness of 2.0 μm.

The ΔHu, ΔTm and heat shrinkage of the thus obtained heat-sensitive films were measured. Further, the thus obtained heat-sensitive film was laminated on, and adhered to a polyester gauze and was subjected to printing using the printer, and character printing characteristics, paint-printing characteristics, sensitivity, withstand printing number, releasing property, adhesiveness, anti-curling property were evaluated as mentioned above. The results are shown in Table 3.

As is apparent from Table 3, by incorporating the above-described specific wax in the heat-sensitive film of the present invention, the heat-sensitive films with especially excellent printing characteristics and sensitivity can be prepared.

EXAMPLES 19-22

Polyester copolymer prepared from an acid component of terephthalic acid/isophthalic acid=85 mol %/15 mol % and glycol component of ethyleneglycol was dried and was supplied to an extruder. The copolymer was melt-extruded at 290° C., and was cast onto a cooling drum with a temperature of 40° C. while applying a static voltage. Then the thus obtained film was stretched to 3.8 times the original length at 80° C. in the longitudinal direction. On the thus prepared uniaxially stretched film, an aqueous solution containing 8% by weight of a mixture of a polyester copolymer I and an organopolysiloxane II with a mixing ratio shown in Table 4 was applied. The film was then stretched to 3.5 times the original length in the transverse direction while drying the coated solution, and was then heatset at 150° C. with 2% relaxation.

On reverse side of the thus obtained heat-sensitive film having a non hot-sticking layer thereon, vinyl acetate-based adhesive was applied using a wire bar and a porous tissue paper with a thickness of 40 μm was superposed thereon to wet-laminate the same and the resulting laminate was dried at 100° C. to adhere the tissue paper.

The thus prepared heat-sensitive mimeograph stencil was subjected to printing and the various characteristics shown in Table 4 were evaluated.

TABLE 3-1

| Example | ΔHu (cal/g) | ΔTm (°C.) | Heat Shrinkage (%) | Releasing Property | Adhesiveness | Anti-Curling Property | Characters Printing: Clearness | Characters Printing: Unevenness of Thickness |
|---|---|---|---|---|---|---|---|---|
| Example 14 | 3 | | 10 | Δ | ○ | ○ | B | Δ |
| Example 15 | 5 | | 10 | ○ | ○ | ○ | A | ○ |
| Example 16 | 7 | | 10 | ○ | ○ | ○ | A | ○ |
| Example 17 | 10 | | 10 | ○ | ○ | ○ | A | ○ |
| Example 18 | 11 | | 10 | ○ | ○ | ○ | A | ○ |

TABLE 4-1

| Example | ΔHu (cal/g) | ΔTm (°C.) | Composition of Non-Hot Sticking Layer: A | B | Weight Ratio A/B | Thickness of Non-Hot Sticking Layer (μm) | Anti-Sticking Property | Noise | State of Perforation | Surface Wetting Tension Front/Reverse |
|---|---|---|---|---|---|---|---|---|---|---|
| Example 19 | 5 | 90 | I | II | 0.05 | 0.01 | ○ | ○ | ○ | 36/40 |
| Example 20 | 5 | 90 | I | II | 0.25 | 0.01 | ◎ | ○ | ○ | 36/40 |
| Example 21 | 5 | 90 | I | II | 0.5 | 0.01 | ◎ | ○ | ○ | 36/39 |
| Example 22 | 5 | 90 | I | II | 1 | 0.01 | ◎ | ○ | ○ | 36/38 |

TABLE 4-2

| Example | Characters Printing: Clearness | Chipping | Thickness | Unevenness of Thickness | Paint-Printing: Clearness | Size Correspondence | Light and Shade |
|---|---|---|---|---|---|---|---|
| Example 19 | B | ○ | ○ | ○ | ○ | ○ | ○ |
| Example 20 | B | ○ | ○ | ○ | ○ | ○ | ○ |
| Exampel 21 | B | ○ | ○ | ○ | ○ | ○ | ○ |
| Example 22 | B | ○ | ○ | ○ | ○ | ○ | ○ |

TABLE 3-2

| Example | Paint-Printing: Clear-ness | Size Corres-pondence | Light and Shade | Sensi-tivity | Withstand Printing Number |
|---|---|---|---|---|---|
| Example 14 | ○ | ○ | Δ | 4H | 3000 |
| Example 15 | ○ | ○ | ○ | 6H | 3500 |
| Example 16 | ○ | ○ | ○ | 6H | 4000 |
| Example 17 | ○ | ○ | ○ | 6H | 3900 |
| Example 18 | Δ | ○ | ○ | 4H | 4100 |

TABLE 4-3

| Example | Sensitivity | Withstand Printing Number | Sticking to Original Copy (Manuscript) |
|---|---|---|---|
| Example 19 | 5H | 2300 | ○ |
| Example 20 | 5H | 2350 | ○ |
| Example 21 | 5H | 2380 | ○ |
| Example 22 | 5H | 2380 | ○ |

As can be seen from Table 4, by using the heat-sensitive mimeograph stencil of the present invention which has a non hot-sticking layer, not only excellent printing characteristics but also excellent anti-sticking property can be obtained. Particularly, when the composition of the no hot-sticking layer (weight ratio of B/A) is in the range of 0.1 to 0.7, actually 0.25 or 0.5 in the examples, the balance of the anti-transcription property (surface wetting tension of the reverse side) and the anti-sticking property are good.

The polyester copolymer I, cross-linking agent, organopolysiloxane II which were used in Examples 19–22 were as follows: Polyester copolymer I: Polyester copolymer prepared by polycondensation of a dicarboxylic acid component of terephthalic acid/isophthalic acid (50/50 mol %) and a glycol component of ethyleneglycol/neopentylglycol (45/55 mol %) with a molecular weight of about 20,000, glass transition temperature of 67° C. and intrinsic viscosity of 0.53. Cross-linking Agent: "Coronate L" (tradename of Nippon Urethane Co., Ltd.) which is an adduct of 1 mole of trimethylolpropane and 3 moles of 2,4-tolylenediisocyanate. The cross-linking agent was added in the amount of 20 parts in terms of solid contents. Organopolysiloxane: Epoxypolyether-modified silicone oil (trade name "Toray Silicone SF8421" manufactured by Toray Silicone Inc.).

We claim:

1. A film for a heat-sensitive mimeograph stencil comprising a polyester-based biaxially stretched film which has an energy of crystal fusion $\Delta Hu$ of 3–11 cal/g and has a difference $\Delta Tm$ between the crystal fusion-terminating temperature and the crystal fusion-starting temperature of 50° C. to 100° c.

2. The film of claim 1, wherein the surface of the film has a center line average roughness Ra of 0.05–0.3 $\mu m$, maximum roughness Rt of 0.5–4.0 $\mu m$, 2,000–10,000 $mm^2$ of projections with a diameter of 1 $\mu m$ or more and 20–1,000/$mm^2$ of projection with a diameter of 8–20 $\mu m$.

3. The film of claim 2, further comprising at least one kind of particle made of a material selected from the group consisting of oxides and inorganic salts of an element belonging to the IIA group, IIIB group, IVA group and IVB group in the periodic table.

4. The film of claim 3, wherein the content of the particles is 0.05–2% by weight.

5. The film of claim 1, further comprising at least one higher aliphatic substance of which a major component is $C_{10}$–$C_{33}$ higher aliphatic monocarboxylic acid or an ester thereof.

6. The film of claim 5, wherein the content of the higher aliphatic substance is 0.005–5% by weight based on the weight of the polyester constituting the film.

7. The film of claim 1, wherein the energy of crystal fusion $\Delta Hu$ is 5–10 cal/g.

8. A heat-sensitive mimeograph stencil comprising a porous support and the film of claim 1 laminated on the porous support.

9. The stencil of claim 8, further comprising a non hot-sticking layer on the surface of the film which surface is other than the surface contacting the porous support.

10. The stencil of claim 9, wherein the non hot-sticking layer comprises as a major component at least one materials selected from the group consisting of thermosetting silicone resins, thermoplastic silicone resins, epoxy resins, melamine resins, phenol resins, thermosetting acrylic resins, polyimide resins, metal salts of aliphatic acids, phosphoric acid esters, supercooling substance, fluorine resins, perfluoroacrylic resins, vinyl chloride resins and vinilidene chloride resins.

11. The stencil of claim 9, wherein the non hot-sticking layer consists essentially of a mixture of polyester copolymer (A) and organopolysiloxane (B), the weight ratio (B/A) of the mixture being 0.01 to 8.

12. The stencil of claim 12, wherein the non hot-sticking layer comprises at least 10% by weight of cured material consisting essentially of an urethane prepolymer having a principal chain of an organopolysiloxane and containing a free isocyanate group as terminal group and/or pendant group.

13. The stencil of claim 7, wherein the non hot-sticking layer comprises cured material consisting essentially of a mixture of an urethane prepolymer (A) having a principal chain of an organopolysiloxane and containing a free isocyanate group as terminal group and/or pendant group, and active hydrogen-containing polymer (B) with the weight ratio of (A)/(B) of 10/90 to 90/10.

* * * * *

UNITED STATES PATENT AND TRADEMARK OFFICE
CERTIFICATE OF CORRECTION

PATENT NO. : 5,061,565

DATED : October 29, 1991

INVENTOR(S) : Seizo Aoki et al

It is certified that error appears in the above-identified patent and that said Letters Patent is hereby corrected as shown below:

In column 1, line 25, please change "48385/85" to --48398/85--.

In column 17, line 27, please change "Examples 6-14" to --Examples 6-13--.

In Columns 19 and 20, in Table 3-2, Example 18, under the heading "Light and Shade", please change "○" to --△--.

In column 22, line 32, please change "12", second occurrence, to --10--.

Signed and Sealed this

Twenty-fifth Day of May, 1993

Attest:

MICHAEL K. KIRK

*Attesting Officer*

*Acting Commissioner of Patents and Trademarks*